United States Patent
Matsuoka et al.

(10) Patent No.: US 9,656,235 B2
(45) Date of Patent: May 23, 2017

(54) OPERATION METHOD FOR MULTICHANNEL APPARATUS AND MULTICHANNEL APPARATUS

(71) Applicant: Kobe Steel, Ltd., Kobe-shi (JP)

(72) Inventors: Akira Matsuoka, Kobe (JP); Koji Noishiki, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 128 days.

(21) Appl. No.: 14/381,134

(22) PCT Filed: Feb. 26, 2013

(86) PCT No.: PCT/JP2013/001117
§ 371 (c)(1),
(2) Date: Aug. 26, 2014

(87) PCT Pub. No.: WO2013/136689
PCT Pub. Date: Sep. 19, 2013

(65) Prior Publication Data
US 2015/0030531 A1    Jan. 29, 2015

(30) Foreign Application Priority Data

Mar. 12, 2012 (JP) .................................. 2012-054488

(51) Int. Cl.
*B01J 19/00* (2006.01)
*B01J 19/24* (2006.01)

(52) U.S. Cl.
CPC ......... *B01J 19/248* (2013.01); *B01J 19/0093* (2013.01); *B01J 2219/00027* (2013.01); *B01J 2219/0086* (2013.01); *B01J 2219/00166* (2013.01); *B01J 2219/00783* (2013.01); *B01J 2219/00873* (2013.01); *B01J 2219/00889* (2013.01); *B01J 2219/00894* (2013.01); *B01J 2219/2401* (2013.01)

(58) Field of Classification Search
CPC .. B01J 19/248; B01J 19/0093; B01D 11/0496
USPC .............. 423/659, DIG. 9; 422/603
See application file for complete search history.

(56) References Cited

U.S. PATENT DOCUMENTS

| | | |
|---|---|---|
| 2005/0245628 A1 | 11/2005 | Hubel et al. |
| 2007/0148062 A1* | 6/2007 | Haas ................... B01J 19/0006 422/603 |
| 2009/0258431 A1 | 10/2009 | Haas et al. |
| 2011/0014718 A1 | 1/2011 | Haas et al. |
| 2014/0133262 A1 | 5/2014 | Nishikawa et al. |

FOREIGN PATENT DOCUMENTS

| | | |
|---|---|---|
| CN | 103608095 A | 2/2014 |
| EP | 1 586 372 A1 | 10/2005 |
| EP | 2 724 774 A1 | 4/2014 |
| JP | 2006 239640 | 9/2006 |
| JP | 2007 105668 | 4/2007 |
| WO | WO 2005/063372 A2 | 7/2005 |
| WO | 2012 176391 | 12/2012 |

OTHER PUBLICATIONS

Akira Matsuoka, et al., "Mixture Promoting Effect by Stacked Multi-Channel Reactor (SMCR)", SCEJ 43$^{rd}$ Autumn Meeting (Nagoya), Lecture No. :X215, Total 4 Pages, (2011) (with English translation).
International Search Report and Written Opinion Issued Jun. 4, 2013 in PCT/JP13/00117 Filed Feb. 26, 2013.
Extended European Search Report issued Dec. 17, 2015 in Patent Application 13761454.1.

* cited by examiner

Primary Examiner — Steven Bos
(74) Attorney, Agent, or Firm — Oblon, McClelland, Maier & Neustadt, L.L.P.

(57) ABSTRACT

A method of operating a microchannel reactor, in which a reaction channel is formed, includes generating a reaction product by causing a chemical reaction in a raw material fluid while causing the same to flow through a reaction channel. If the flow rate of the raw material fluid and/or the reaction product fluid flowing through a reaction channel decreases, a fluid which is inert to the raw material fluid and the reaction product is mixed into the fluid flowing through the reaction channel, in a flow rate corresponding to the decreased flow rate and at a position downstream of the introduction position of the raw material fluid into the reaction channel.

3 Claims, 6 Drawing Sheets

OPERATION METHOD FOR MULTICHANNEL APPARATUS AND MULTICHANNEL APPARATUS

TECHNICAL FIELD

The present invention relates to an operation method for a multichannel apparatus and the multichannel apparatus.

BACKGROUND ART

Conventionally, as a method of bringing reactants in a fluid form in contact with each other, and mixing the reactants with each other, thereby producing a reaction product, a method of using a multichannel apparatus so-called microchannel reactor is known.

The microchannel reactor includes a substrate on a surface of which minute groves are formed, and the minute grooves formed on the surface of the substrate construct reaction channels for mixing the raw material fluids with each other. The multichannel apparatus causes the raw material fluids subject to the reaction to flow in the reaction channels, thereby drastically increasing a contact area between the raw material fluids per unit volume, resulting in an increase in efficiency of the mixture of the raw material fluids. The microchannel reactor is used for applications such as production of chemical products and medicines.

Patent document 1 discloses a microchannel reactor as an example of the multichannel apparatus. The microchannel reactor includes first introduction channels through which a first reactant (first raw material fluid) required for a reaction in the reactor flows, and second introduction channels connected to a middle portion in a flow direction of the first introduction channels through which a second reactant (second raw material fluid) flows. The first reactant which has flown through the first introduction channels and the second reactant which has flown through the second introduction channels cause a chemical reaction at confluence portions of both of the introduction channels, and a generated reaction product is brought via the first introduction channels to an outside of the reaction channels.

On the other hand, the multichannel apparatus having a structure such as the microchannel reactor is sometimes used as a heat exchanger for heating a subject fluid.

If the microchannel reactor disclosed in Patent Document 1 is used to bring the raw material fluids into contact with each other, and to mix the raw material fluids with each other, the following problem occurs.

A case where a first raw material fluid A and a second raw material fluid B are introduced into a microchannel reactor, and are caused to react with each other in the reactor as shown in FIG. 2 is considered, for example. On this occasion, it is assumed that the first raw material fluid A and the second raw material fluid B respectively of 100 in volume flow rate are supplied, and a reaction product C of 200 in volume flow rate is generated as a result of the reaction between both the fluids. In this case, a residence period of 10 seconds is necessary for the production of the reaction product and the discharge of the reaction product out from the reactor after the raw materials are supplied into the microchannel reactor.

By the way, the reaction is possibly carried out by using the fluids in smaller amounts. The first raw material fluid A (volume flow rate of 50) and the second raw material fluid B (volume flow rate of 50) are introduced into the microchannel reactor, and are caused to react with each other in FIG. 3. In this case, the flow rates of the raw material fluids are small, and the flow rate of the generated reaction product decreases accordingly. However, even if the flow rate of the generated reaction product decreases, capacities of the channels remain the same, a period during which the raw materials and the reaction product flow through the microchannel reactor increases, and the residence period thus increases. For example, while the residence period is 10 seconds in the example in FIG. 2, the residence period increases to 20 seconds in the example in FIG. 3. As the residence period increases, a reaction period increases, and as a result the reaction proceeds excessively or unnecessary reactions occur. Therefore, even if the reaction product of 100 in volume flow rate is produced, a possibility of a component of the reaction product becoming a component C', which is different in quality from an intended component C, cannot be denied.

In other words, some reaction products to be produced by the microchannel reactor generate unnecessary byproducts or present a decrease in yield of an intended reaction product by an amount corresponding to an increase in amount of byproducts if the period residing in the reactor is too long. Thus, it is preferable to provide certain means for maintaining a constant residence period of the reaction product in the reaction channels regardless of supply amounts of the raw material fluids in order to obtain the reaction product having a stable quality in the microchannel reactor even if supply amounts of the raw material fluids decrease.

Of course, it is conceivable to adjust the flow rate and thereby maintain the residence period of the reaction product by a way of preparing a plurality of reactors and operate a required number of the reactors, or closing some of reaction channels provided for a reactor by any way, etc. However, it is extremely difficult to provide such means due to an economical problem and in terms of such a point that the structure of the multichannel apparatus is minute.

CITATION LIST

Patent Document
  Patent Document 1: JP 2008-168173 A

SUMMARY OF THE INVENTION

An object of the present invention is to maintain a constant residence period of a reaction product residing in reaction channels, thereby stably obtaining the reaction product having a desired quality.

An operation method for a multichannel apparatus according to an aspect of the present invention is a method of operating a multichannel apparatus in which a reaction channel is formed, and includes a step of generating a reaction product by generating a chemical reaction in a raw material fluid while causing the raw material fluid to flow through in the reaction channel, where if a flow rate of at least either one fluid of the raw material fluid and the reaction product fluid flowing through the reaction channel decreases, a fluid which is inert to the raw material fluid and the reaction product is mixed with the fluids flowing through the reaction channel in a flow rate corresponding to the decreased flow rate at a position on a downstream side of an introduction position of the raw material fluid into the reaction channel.

A multichannel apparatus according to another aspect of the present invention includes a reaction channel for generating a reaction product by generating a chemical reaction in a raw material fluid while causing the raw material fluid to flow, where the reaction channel includes a mixing portion for introducing, if a flow rate of at least one fluid of the raw material fluid and the reaction product fluid flowing through the reaction channel decreases, a fluid inert to the raw material fluid and the reaction product into the reaction channel to mix with the fluids flowing through the reaction channel, and the mixing portion is arranged at a position on a downstream side of a position for introducing the raw material fluid into the reaction channel.

DESCRIPTION OF EMBODIMENTS

A description will now be given of a multichannel apparatus 1 according to an embodiment of the present invention referring to drawings.

The multichannel apparatus 1 according to the embodiment is an apparatus for causing a first raw material fluid A and a second raw material fluid B, which are different in type from each other, to chemically react with each other inside, thereby obtaining a reaction product C. The multichannel apparatus 1 is referred to as microchannel rector 3. First, a description is given of a chemical production apparatus 2 on which the microchannel reactor 3 is installed prior to a description of the microchannel reactor 3.

Figure 1:
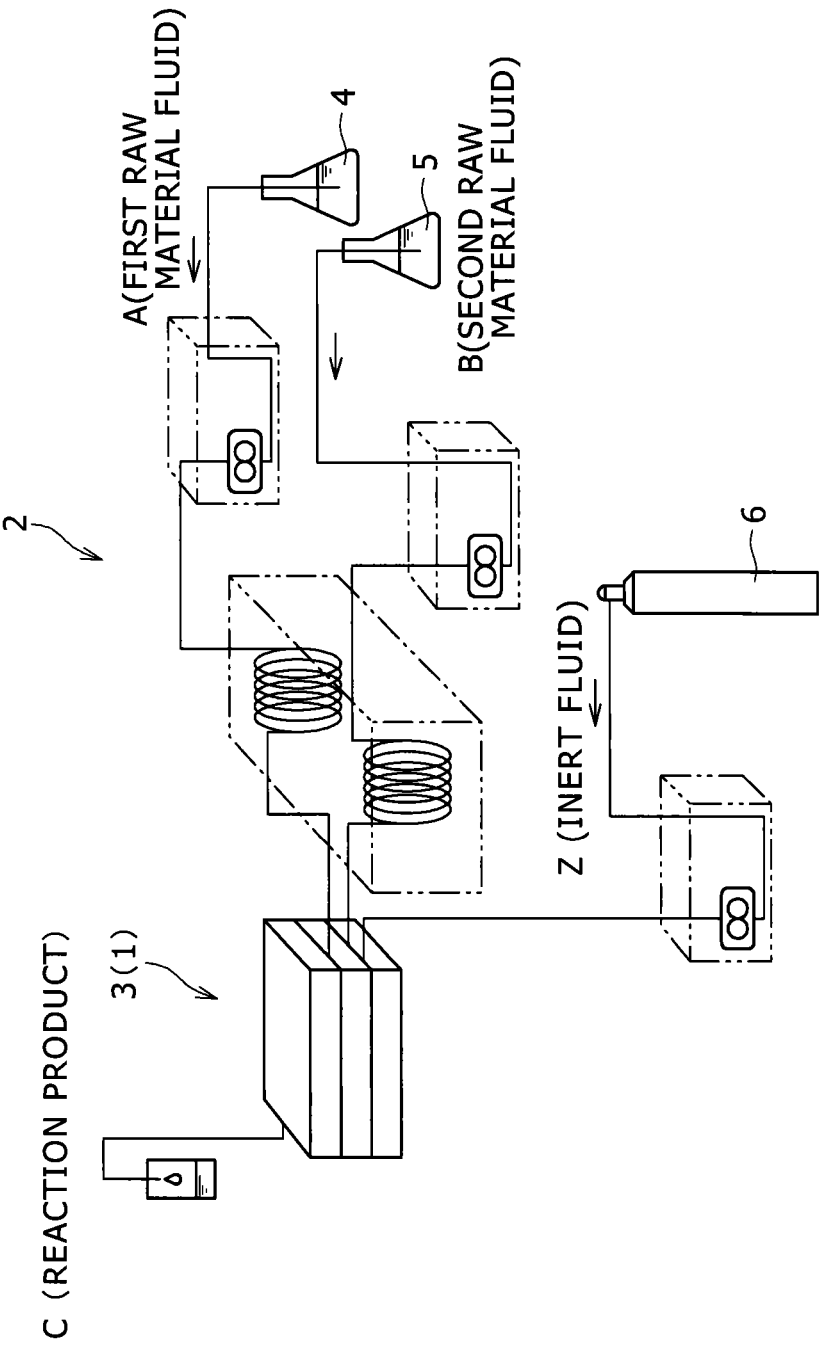
FIG. 1 is a schematic diagram of a chemical production apparatus in which a multichannel apparatus relating to an embodiment of the present invention is installed.

FIG. 1 shows the chemical production apparatus 2 provided with the microchannel reactor 3. The chemical production apparatus 2 includes a first raw material supply unit 4 for supplying the first raw material fluid A (fluid represented as "A" in the drawing), a second raw material supply unit 5 for supplying the second raw material fluid B (fluid represented as "B" in the drawing), and the microchannel reactor 3 for mixing and reacting the first raw material fluid A and the second raw material fluid B with each other. The first raw material fluid A and the second raw material fluid B are supplied respectively from the first raw material supply unit 4 and the second raw material supply unit 5 via pumps and a temperature adjustment apparatus to the microchannel reactor 3 in the chemical production apparatus 2 in FIG. 1. Moreover, the chemical production apparatus 2 is provided with an inert fluid supply unit 6 for supplying a fluid Z inert to any of the first raw material fluid A, the second raw material fluid B, and the generated reaction product C. Moreover, there is provided a flow rate adjustment unit for adjusting a flow rate of the inert fluid Z supplied to the microchannel reactor 3 on a downstream side of the inert fluid supply unit 6 and on an upstream side of the microchannel reactor 3. For example, a pump for feeding the inert fluid Z, and capable of adjusting the flow rate is used, or a flow rate adjustment valve provided on a downstream side of a pump feeding the inert fluid Z is used as the flow rate adjustment unit.

Figure 2:
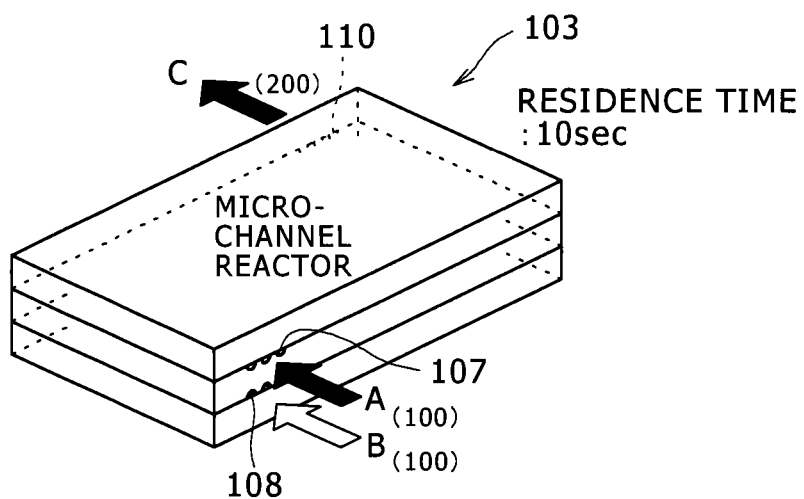
FIG. 2 is an explanatory diagram of a balance state between raw material fluids and a reaction product for a multichannel apparatus according to a first comparative example of the embodiment.
Figure 3:
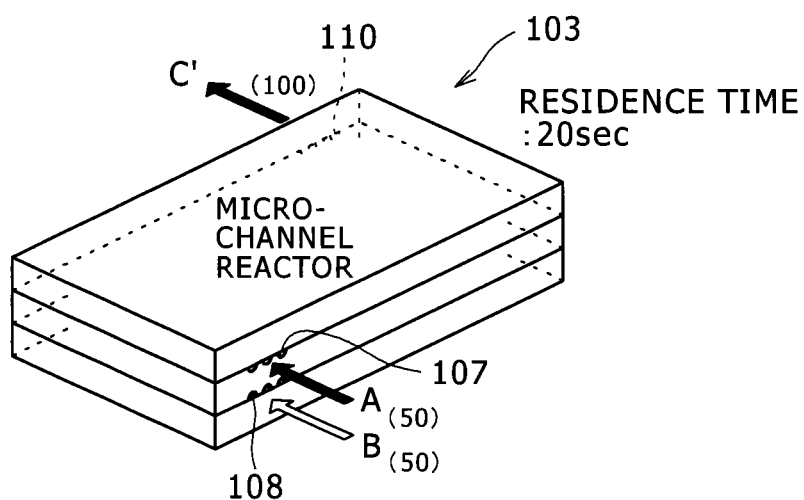
FIG. 3 is an explanatory diagram of a balance state between the raw material fluids and the reaction product for the multichannel apparatus according to a second comparative example of the embodiment.
Figure 4:
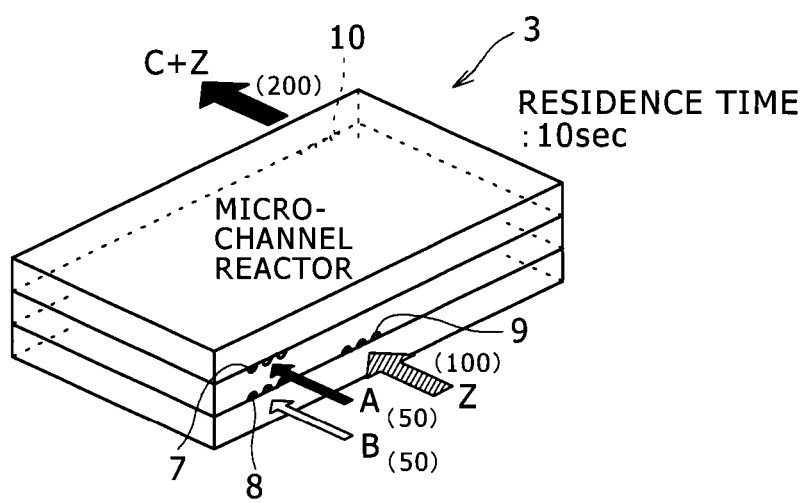
FIG. 4 is an explanatory diagram of the balance state between the raw material fluids and the reaction product for the multichannel apparatus according to the embodiment.

FIGS. 2 to 4 show a microchannel reactor and a usage thereof. Particularly, FIGS. 2 and 3 show how to use a conventional microchannel reactor 103, and FIG. 4 shows how to use the microchannel reactor 3 according to this embodiment.

The microchannel reactor 3 is a chemical reaction apparatus used when a desired chemical substance and a medicine are produced in any case of FIGS. 2 to 4. The microchannel reactor 3 has a structure constructed by piling a large number of (three in the illustrated example) channel plates P1 to P3 in a thickness direction of the channel plates. The microchannel reactor 3 has a rectangular exterior. First inflow openings 7 for causing the first raw material fluid A to flow into the microchannel reactor 3 and second inflow openings 8 for causing the second raw material fluid B to flow into the microchannel reactor 3 are opened on one of side surfaces (surface facing a proximal side in FIGS. 2 to 4 in a widthwise direction of the microchannel reactor 3) of the microchannel reactor 3. The proximal side in FIGS. 2 to 4 in the widthwise direction of the microchannel reactor is simply referred to as "proximal side" hereinafter. Third inflow openings 9 for causing the inert fluid Z to flow into the microchannel reactor 3 are formed on the side surface on the proximal side of the microchannel reactor 3 according to this embodiment illustrated in FIG. 4. The third inflow openings 9 are arranged at a distance on a side of the second inflow openings 8.

Moreover, outflow openings 10 for discharging the reaction product C generated from the first raw material fluid A and the second raw material fluid B to the outside of the reactor are opened on the other side surface, which is a side surface (side surface facing a distal side in FIGS. 2 to 4 in the widthwise direction of the microchannel reactor 3) on an opposite side of the one side surface of the microchannel reactor 3. The distal side in FIGS. 2 to 4 in the widthwise direction of the microchannel reactor is simply referred to as "distal side" hereinafter.

Figure 5:
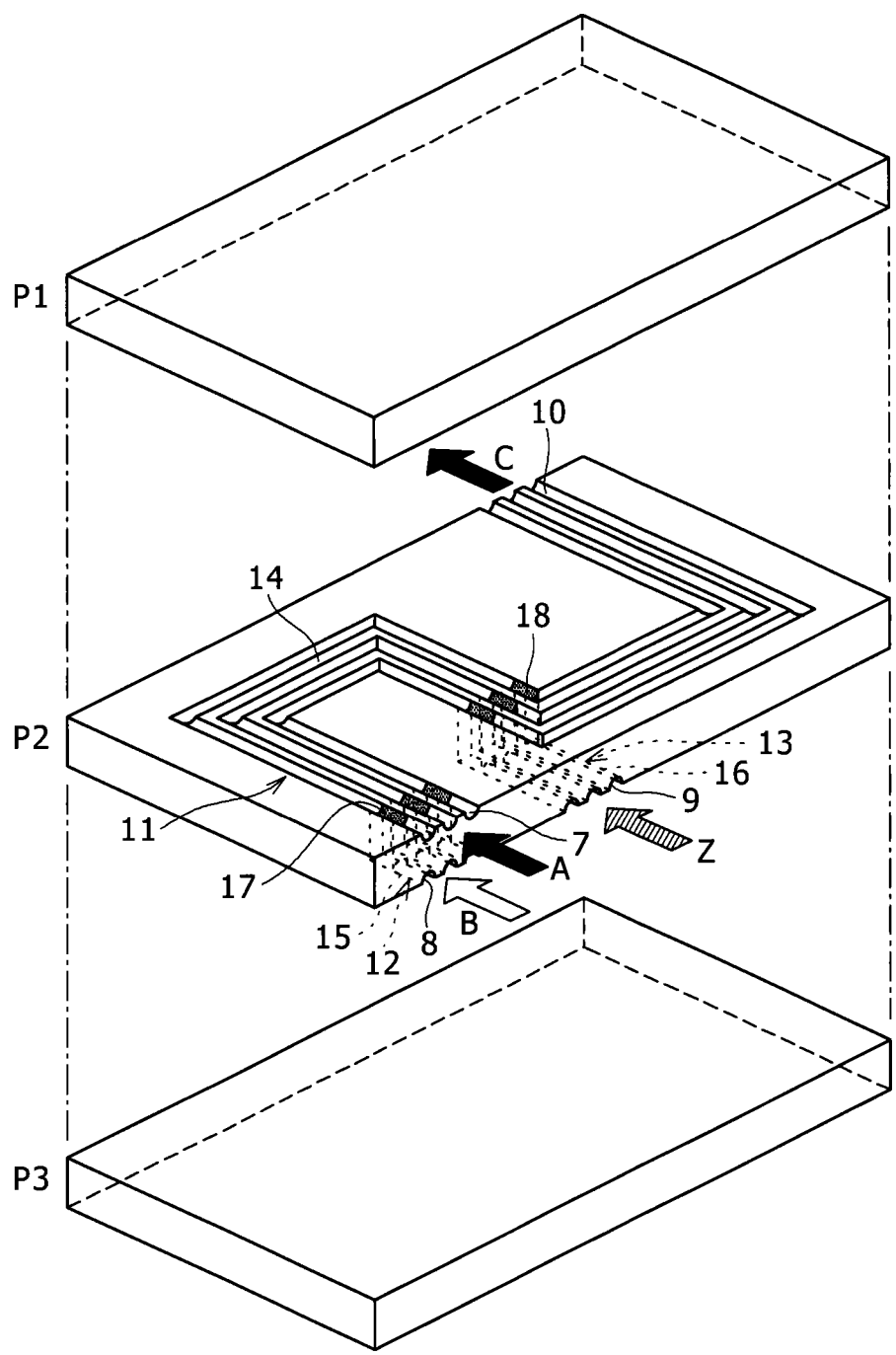
FIG. 5 is an exploded view showing exploded respective channel plates of the multichannel apparatus.

FIG. 5 is a view showing a state where the microchannel reactor 3 is disassembled in a vertical direction. FIG. 5 shows channel plates P1 to P3 used for the microchannel reactor 3. A top channel plate is denoted by "P1", a middle channel plate is denoted by "P2", and a bottom channel plate is denoted by "P3" out of the three channel plates P1 to P3. It should be noted that configurations of the channel plates and channel grooves are schematically shown in FIG. 5, and the present invention is not limited to the configurations in FIG. 5.

A plurality of rows of the channel grooves semicircular in cross section are formed by chemical etching or the like on a top surface (front surface) and a bottom surface (rear surface) of the channel plate P2 as illustrated in FIG. 5. Each of the channel grooves has an opening width of some micrometers to some millimeters. First channels 11, second channels 12, and third channels 13 to be discussed below are formed by using the channel grooves. The first channels 11 communicate with the first inflow openings 7 and the outflow openings 10. The second channels 12 communicate with the second inflow openings 8. The third channels 13 communicate with the third inflow openings 9.

First channel grooves 14 are formed so as to form downward recessed shapes on the top surface of the channel plate P2. The first channels 14 (refer to FIG. 6) extend from an end edge on the proximal side of the channel plate P2 toward the distal side, and bend at the right angle in a direction parallel with the lengthwise direction of the channel plate P2 before the channels 14 reach an end edge on the distal side. Then, the first channels 14 extend in the direction parallel with the lengthwise direction of the channel plate P2, then bend at the right angle toward the proximal side, and again bend at the right angle in the direction parallel with the lengthwise direction of the channel plate P2 before the first channels 14 reach the end edge on the proximal side. Subsequently, the first channels 14 meanders repeating the bend at the right angle for a plurality of times. The first channels 14 finally reach the end edge on the distal side of the channel plate P2 on the opposite side to the proximal side of the channel plate P2 on which start points of the first channels 14 are formed. The start points of the first channel grooves 14 form the first inflow openings 7, and end points of the first channel grooves 14 form the outflow openings 10.

A bottom surface of the channel plate P1 formed to be planar is overlapped on the first channel grooves 14 formed on the top surface of the channel plate P2. As a result, the first channels 11 through which the first raw material fluid A flows are formed from the first inflow openings 7 to the outflow openings 10.

On the other hand, portions of the second channel grooves 15 are formed on the bottom surface of the channel plate P2, and the portions extend straight from the end edge on the proximal side of the channel plate P2 as start points toward a center side in the widthwise direction (direction orthogonal to the lengthwise direction) of the channel plate P2 as in the case of the first channel grooves 14. The second channel grooves 15 bend upward before the second channel grooves 15 reach the center in the widthwise direction of the channel plate P2, and pass through in the thickness direction of the channel plate P2. Portions of the second channel grooves 15 formed on a bottom surface of the channel plate P2 are formed to have semicircular cross sections protruding upward, and end portions on the proximal side form the second inflow openings 8. Top ends of portions extending upward of the second channel grooves 15 intersect with the first channel grooves 14. The intersections between the first channel grooves 14 and the second channel grooves 15 form confluence portions 17.

Further, portions of the third channel grooves 16 arranged in parallel with the second channel grooves 15 are formed on the bottom surface of the channel plate P2. The portions of the third channel grooves 16 extend straight from the end edge on the proximal side of the channel plate P2 as start points toward the center side in the widthwise direction of the channel plate P2 as in the cases of the first channel grooves 14 and the second channel grooves 15. The third channel grooves 16 bend upward, and pass through the channel plate P2 in the thickness direction as is the case for the second channel grooves 15. Portions of the third channel grooves 16 formed on the bottom surface of the channel plate P2 are formed to have semicircular cross sections protruding upward, and end portions on the proximal side form the third inflow openings 9. Top ends of portions extending upward of the third channel grooves 16 intersect with the first channel grooves 14. The intersections between the first channel grooves 14 and the third channel grooves 16 form mixing portions 18.

The confluence portions 17 and the mixing portions 18 are provided between the first inflow openings 7 and the outflow openings 10 on the first channels 11, and the mixing portions 18 are arranged on a downstream side of the confluence portions 17. Portions between the confluence portions 17 and the outflow openings 10 on the first channels 11 are configured as reaction channels.

A top surface of the channel plate P3 is formed to be planar. The top surface of the channel plate P3 is piled on the channel plate P2 from below, thereby closing openings on the bottom side of the second channel grooves 15 and openings on the bottom side of the third channel grooves 16. The second channel grooves 15 closed at the openings form the second channels 12, and the third channel grooves 16 closed at the openings form the third channels 13. The second channels 12 feed the second raw material fluid B from the second inflow openings 8 to the confluence portions 17, and the third channels 13 feed the inert fluid Z from the third inflow openings 9 to the mixing portions 18.

The channel plates P1 and P3 piled on the channel plate P2 do not form channels, and serve as partition plates. If the temperature needs to be adjusted in the reactor, temperature adjustment channels are formed on the top surface of the channel plate P1 or the bottom surface of the channel plate P3, thereby constructing a single reactor with the channel plates P1, P2, and P3.

Figure 6:
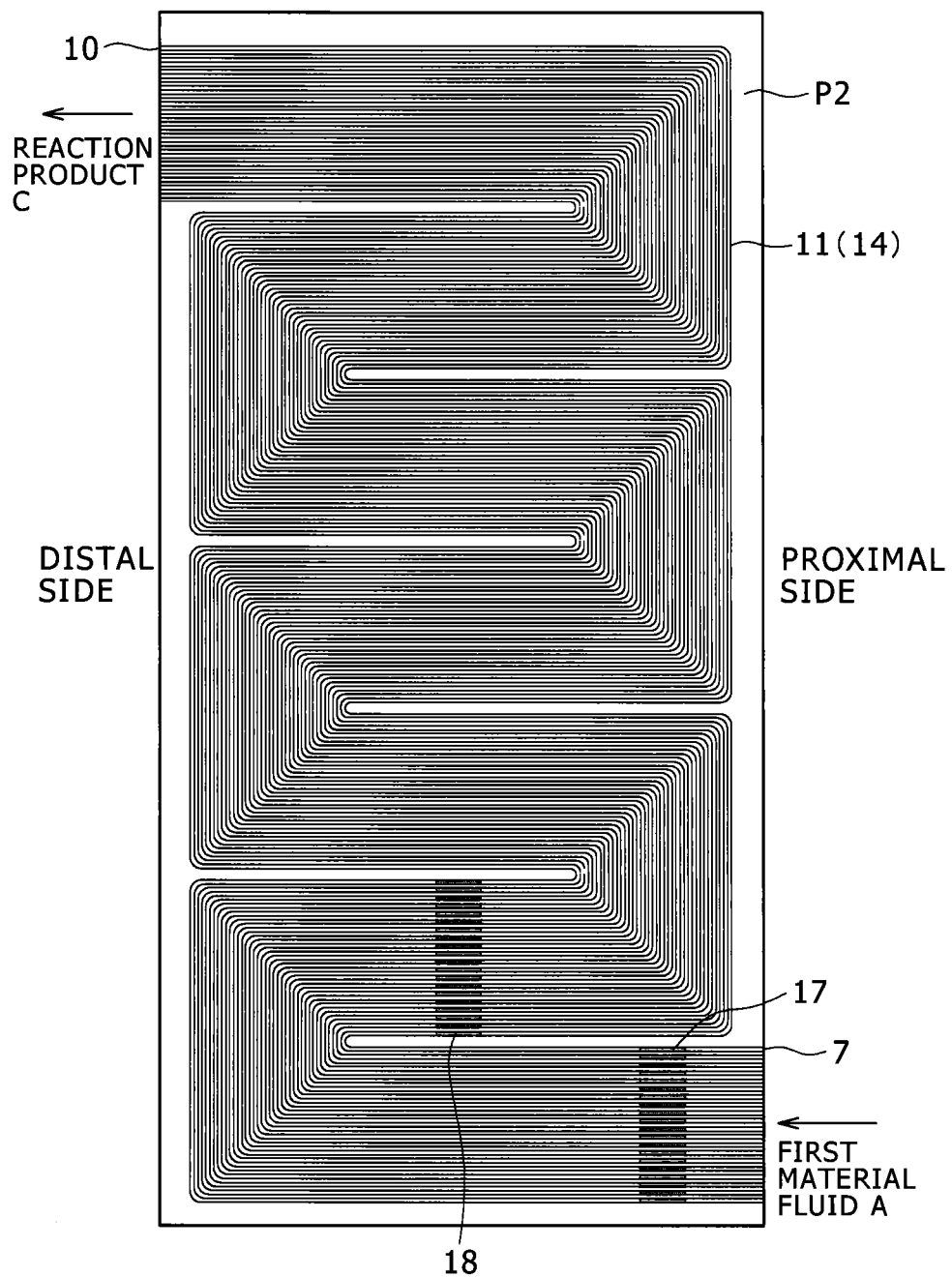
FIG. 6 is an enlarged view of a surface of the channel plate used for the multichannel apparatus.

FIG. 6 shows an example of an actual channel plate forming the channels of the configuration as described above. A plurality of reaction channels is provided, and the number of bends (number of zigzags) of the channels is large on the actual channel plate as illustrated in this figure. The reaction channels have very long channel lengths. The confluence portions 17 which are openings passing through the channel plate are formed in middle portions of the reaction channels. The mixing portions 18, which are openings passing through the channel plate, are formed at positions on the downstream side of the confluence portions 17 of the reaction channels.

By the way, a consideration is given of such a case as the first raw material fluid A is introduced via the first inflow openings 107 into the microchannel reactor 103, the second raw material fluid B is introduced via the second inflow openings 108 into the microchannel reactor 103, and the raw material fluids A and B are caused to react with each other in the microchannel reactor 103 in the conventional microchannel reactor 103 as shown in FIG. 2. On this occasion, it is assumed that when a volume flow rate of the first raw material fluid A is 100, a volume flow rate of the second raw material fluid B is 100, and both the fluids are caused to reside in the microchannel reactor 103 for ten seconds to react, and the reaction product C of 200 in volume flow rate is produced and discharged from the outflow openings 110.

However, if the first raw material fluid A of 50 in volume flow rate is introduced via the first inflow opening 107 into the micro channel reactor 103, the second raw material fluid B of 50 in volume flow rate is introduced via the second inflow opening 108 into the micro channel reactor 103, and the raw material fluids A and B are caused to react with each other as shown in FIG. 3, a period during which the reaction product C flows through the microchannel reactor 103 increases by an amount corresponding to a decrease in quantity of the reaction fluids, and the residence period of the raw material fluids A and B increases. For example, the residence period of the raw material fluids A and B becomes 20 seconds. In this case, the residence period, namely, the period taken for the reaction, increases, and, accordingly, the component of the acquired reaction product of 100 in volume flow rate can possibly be a component C' which is different in quality from the intended component C, for example.

Thus, if the flow rate of at least one fluid of the fluids of the raw material fluids A and B and the reaction product C flowing through the reaction channels (first channels 11 on the downstream side of the confluence portions 17) decreases, the fluid Z (represented by reference numeral Z in FIG. 4) inert to any of the raw material fluids A and B and the reaction product C is caused to merge and mix with the fluids flowing through the reaction channels via the third inflow openings 9 (third channels 13) at the positions on the downstream side of the introduction positions (confluence portions 17 described above) of the raw material fluids in the operation method of the multichannel apparatus 1 according to this embodiment.

Specifically, a fluid which does not mix with and does not chemically react with any of the raw material fluids A and B and the reaction product C can be named as the fluid Z which is inert to any of the raw material fluids A and B and the reaction product C. A material, such as nitrogen and argon, which is chemically inert to the raw material fluids A and B and the reaction product C, or a material which is not compatible and does not react with the raw material fluids A and B and the reaction product C, as oil for water, can be named as the inert fluid Z. Only the inert fluid Z which is no longer necessary can be surely and easily removed from the reaction product C outside the reactor by using such a material as the inert fluid Z.

Then, the above-mentioned inert fluid Z is caused to merge and mix with the raw material fluids at the positions on the downstream side of the introduction positions (confluence portions 17) of the raw material fluids and the upstream side of the extraction positions (outflow openings 10) of the reaction product C. In other words, the mixing portions 18 for causing the inert fluid Z to merge and mix with the fluids flowing through the first channels 11 are provided at positions on the downstream side of the confluence portions 17 and on the upstream side of the outflow openings 10 in the above-mentioned first channels 11 as in the case of the second raw material fluid B as illustrated in FIGS. 5 and 6. The above-mentioned third channels 13 are connected to the mixing portions 18, and the inert fluids Z is introduced via the inlets of the third channels 13, namely the third inflow openings 9, into the third channels 13.

An amount of the inert fluid Z caused to merge (mix) with the fluids flowing through the first channels 11 (reaction channels) at the mixing portions 18 may be equal to the decrease in the flow rates of the raw material fluids respectively flowing in the first channels 11 and the second flow channels 12, or may be calculated based on the decrease. Moreover, the quantity of the inert fluid Z may be determined using a decrease in the flow rate of the reaction product C extracted to the outside of the reactor as a reference.

Figure 7:
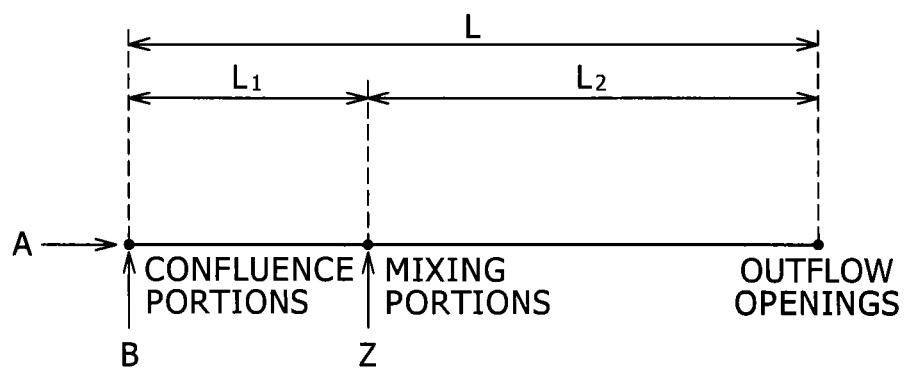
FIG. 7 is a diagram showing how fluids flow in the multichannel apparatus.

For example, a consideration is give of such a case that the raw material fluid A and the raw material fluid B merge with each other at the confluence portions 17, and react with each other while flowing through the first channels 11 from the confluence portions 17 to the outflow openings 10 by a distance L as illustrated in FIG. 7. It should be noted that the inert fluid Z is introduced into the first channels 11 via the mixing portions 18 located on the downstream side from the confluence portions 17 by a distance $L_1$, and flows through the first channels 11 from the mixing portions 18 to the outflow openings 10 over a distance $L_2$ to be discharged to outside of the reactor. A residence period t in a normal state, and a residence period t' after an decrease in flow rate are represented by Equation (1) where a channel cross sectional area of the first channels 11 is S, the flow rate of the raw material fluid A in the normal state (before the decrease in flow rate) is $F_A$, the flow rate of the raw material fluid B in the normal state (before the decrease in flow rate) is $F_B$, the flow rate of the raw material fluid A after the decrease in flow rate is $F_A'$, and the flow rate of the raw material fluid B after the decrease in flow rate is $F_B'$.

[Equation 1]

$$t = \frac{L}{\left(\frac{F_A + F_B}{S}\right)} \quad (1)$$

$$t' = \frac{L_1}{\left(\frac{F_A' + F_B'}{S}\right)} + \frac{L_2}{\left(\frac{F_A' + F_B' + F_Z}{S}\right)}$$

The amount of the inert fluid Z (flow rate $F_Z$) should be determined so that the residence period t' after the decrease in flow rate matches the residence period t in the normal state, or a difference therebetween is minimum according to this embodiment. The flow rate of the inert fluid Z supplied to the reactor is adjusted by the flow rate adjustment unit so that the flow rate of the inert fluid Z to be caused to merge with the fluids flowing through the reaction channels at the mixing portions 18 is the flow rate as determined above according to this embodiment.

If the inert fluid Z in the flow rate corresponding to the decrease in flow rate of at least one fluid of the raw material fluids A and B and the reaction product C is introduced from the mixing portions 18 to the first channels 11 (reaction channels), the flow rate of the sum of the raw material fluids A and B, the reaction product C, and the inert fluid Z flowing through the first channels 11 is equal to the flow rate before the decrease in flow rate of the raw material fluids, and the residence period of the reaction product C remains approximately constant in the residence period before the decrease in flow rate. Thus, the residence period of the raw material fluid does not become too long, and such problems that unnecessary byproducts are generated and the yield of the reaction product C decreases do not occur. In other words, even if the supply amount of the raw material fluid decreases, the residence period of the reaction product C, namely the flow rate of the reaction product C in the reaction channels can be maintained constant, resulting in obtaining the reaction product having a stable quality by using the microchannel reactor 3 according to this embodiment.

Thus, it is not necessary for this embodiment to close some of the plurality of reaction channels of the microchannel reactors 3 to adjust the flow rate of the raw material fluids and the reaction product C, and it is thus not necessary to unnecessarily increase complexity of the structure of the microchannel reactor 3.

It should be understood that the disclosed embodiment is an example in terms of all the points, and are not limitative. Particularly in the embodiment disclosed herein, items which are not explicitly disclosed such as operation conditions, work conditions, various parameters, dimensions, weights, volumes, and the like of the components do not depart from extents which a person skilled in the art normally embodies, and employ values which a normal person skilled in the art easily envisages.

For example, the microchannel reactor 3 for acquiring the reaction product C by using the chemical reaction is exemplified as the multichannel apparatus 1 in the embodiment mentioned above, but the multichannel apparatus 1 can be used as a heat exchanger for heating or cooling the subject fluid, particularly a heat exchanger capable of precisely controlling a moving heat quantity.

For example, if a heat exchanger in which channels for carrying out heat exchange using a working medium such as flon and water are formed is operated, when a flow rate of the working medium flowing through the channels decreased, it is preferable that a fluid chemically inert to and incompatible with the working medium is merged (mixed) with the working medium flowing through the channels on a downstream side of introduction positions of the working medium with respect to the channels in a flow rate corresponding to the decrease in the flow rate of the working medium.

[Overview of Embodiment]

The embodiment is summarized as follows.

The operation method for multichannel apparatus according to the embodiment is a method of operating a multichannel apparatus in which a reaction channel is formed, and includes a step of generating a reaction product by generating a chemical reaction in the raw material fluid while causing the raw material fluid to flow through the reaction channel, where if a flow rate of at least either one fluid of the raw material fluid and the reaction product fluid flowing through the reaction channel decreases, a fluid inert to the raw material fluid and the reaction product in a flow rate corresponding to the decreased flow rate is mixed with the fluids flowing through the reaction channel at a position on a downstream side of an introduction position of the raw material fluid into the reaction channel.

In the above-mentioned operation method for the multichannel apparatus, it is preferable that the inert fluid in a flow rate equal to the decreased flow rate is mixed with the fluids flowing through the reaction channel.

In the above-mentioned operation method for the multichannel apparatus, it is preferable that the inert fluid is mixed with the fluids flowing through the reaction cannel at a position on a downstream side of the introduction position of the raw material fluid into the reaction channel and on an upstream side of an extraction position of the reaction product from the reaction channel.

The multichannel apparatus according to the embodiment includes a reaction channel for generating a reaction product by generating a chemical reaction in a raw material fluid while causing the raw material fluid to flow, where the reaction channel includes a mixing portion for introducing, if a flow rate of at least either one fluid of the raw material fluid and the reaction product fluid flowing though the reaction channel decreases, a fluid which is inert to the raw material fluid and the reaction product into the reaction channel to mix with the fluids flowing through the reaction channel, and the mixing portion is arranged at a position on a downstream side of a position for introducing the raw material fluid into the reaction channel.

In the multichannel apparatus, it is preferable that the reaction channel includes an inflow opening for causing the raw material fluid to flow into the reaction channel, and an outflow opening for causing the reaction product to flow out from the reaction channel, and the mixing portion is arranged between the inflow opening and the outflow opening.

As described above, according to the embodiment, a constant residence period of a reaction product residing in the reaction channels can be maintained, thereby stably obtaining a reaction product having a desired quality.

The invention claimed is:

1. A method of operating a multichannel apparatus in which a reaction channel is present, comprising:

introducing a raw material fluid into the multichannel apparatus to generate a reaction product fluid by generating a chemical reaction in the raw material fluid flowing through the reaction channel, wherein the raw material fluid is introduced into the multichannel apparatus at a flow rate determined to result in a residence period of the reaction product fluid in the reaction channel, which residence period provides a chemical reaction and produces a certain flow rate of the reaction product fluid exiting the reaction channel, determining a decrease from at least one of the determined flow rate of the raw material fluid being introduced into the multichannel apparatus and the certain flow rate of the reaction product fluid exiting the reaction channel; and when it is determined that at least one of the flow rate of the raw material fluid being introduced into the multichannel apparatus is decreased from the determined flow rate and the flow rate of the reaction product fluid exiting the reaction channel is decreased from the certain flow rate, introducing into the multichannel apparatus an inert fluid which is inert to the raw material fluid and the reaction product fluid, at a flow rate corresponding to the at least one of the decreased flow rate of the raw material fluid being introduced into the multichannel apparatus from the determined flow rate and the decreased flow rate of the reaction product fluid exiting the reaction channel from the certain flow rate, wherein the inert fluid is introduced into the multichannel apparatus at a position along a flow path of the raw material fluid in the multichannel apparatus that is on a downstream side of an introduction position of the raw material fluid into the multichannel apparatus, to mix the inert fluid with the raw material fluid flowing through the reaction channel.

2. The method of operating the multichannel apparatus according to claim 1, wherein the inert fluid is introduced into the multichannel apparatus at a position on an upstream side of an extraction position of the reaction product fluid from the reaction channel.

3. A method of operating a multichannel apparatus in which a reaction channel is present, comprising:

introducing a raw material fluid into the multichannel apparatus to generate a reaction product fluid by generating a chemical reaction in the raw material fluid flowing through the reaction channel, wherein the raw material fluid is introduced into the multichannel apparatus at a flow rate determined to result in a residence period of the reaction product fluid in the reaction channel, which residence period provides a chemical reaction and produces a certain flow rate of the reaction product fluid exiting the reaction channel, determining a decrease of the determined flow rate of the raw material fluid being introduced into the multichannel apparatus; and when it is determined that the flow rate of the raw material fluid being introduced into the multichannel apparatus is decreased from the determined flow rate, introducing into the multichannel apparatus an inert fluid which is inert to the raw material fluid and the reaction product fluid, at a flow rate corresponding to the decreased flow rate of the raw material fluid being introduced into the multichannel apparatus, wherein the inert fluid is introduced into the multichannel apparatus at a position along a flow path of the raw material fluid in the multichannel apparatus that is on a downstream side of an introduction position of the raw material fluid into the multichannel apparatus, to mix the inert fluid with the raw material fluid flowing through the reaction channel.

* * * * *